(12) United States Patent
Kuwahara

(10) Patent No.: US 10,009,186 B2
(45) Date of Patent: Jun. 26, 2018

(54) SERVER DEVICE, COMMUNICATION SYSTEM, INFORMATION-PROCESSING DEVICE, COMMUNICATION METHOD, AND STORAGE MEDIUM

(75) Inventor: Masato Kuwahara, Kyoto (JP)

(73) Assignee: NINTENDO CO., LTD., Kyoto (JP)

( * ) Notice: Subject to any disclaimer, the term of this patent is extended or adjusted under 35 U.S.C. 154(b) by 242 days.

(21) Appl. No.: 13/415,079

(22) Filed: Mar. 8, 2012

(65) Prior Publication Data

US 2013/0103845 A1 Apr. 25, 2013

(30) Foreign Application Priority Data

Oct. 19, 2011 (JP) .................................. 2011-229716

(51) Int. Cl.
*G06F 15/16* (2006.01)
*H04L 12/14* (2006.01)

(52) U.S. Cl.
CPC ........ *H04L 12/1435* (2013.01); *H04L 12/146* (2013.01); *H04L 12/1432* (2013.01); *H04L 12/1442* (2013.01)

(58) Field of Classification Search
CPC ............... H04L 12/1435; H04L 12/146; H04L 12/1432; H04L 12/1442
USPC ..................................................... 463/29, 43
See application file for complete search history.

(56) References Cited

U.S. PATENT DOCUMENTS

| 2006/0074701 A1* | 4/2006 | Liu ....................... G06Q 20/04 463/25 |
| 2009/0216840 A1* | 8/2009 | Pajunen .................. G06F 9/541 709/206 |
| 2011/0105221 A1* | 5/2011 | Sotoike ................... A63F 13/35 463/29 |
| 2011/0151978 A1* | 6/2011 | Hutchinson-Kay ..... A63F 13/12 463/42 |
| 2012/0089713 A1* | 4/2012 | Carriere .............. H04L 12/4641 709/222 |

FOREIGN PATENT DOCUMENTS

| JP | 2000-334170 | 12/2000 |
| JP | 4676033 B1 | 4/2011 |
| JP | 2011-97993 | 5/2011 |

* cited by examiner

*Primary Examiner* — Dhairya A Patel
(74) *Attorney, Agent, or Firm* — Nixon & Vanderhye P.C.

(57) ABSTRACT

A server device includes a storage unit that stores a database that records plural pairs of a user/device ID and a corresponding first parameter, the first parameter indicating an amount of data that the user or the device has a right to communicate via a predetermined network; a first obtaining unit that obtains a user/device ID and a corresponding retail ID from the information-processing device; an adding unit that performs, in a case that the first obtaining unit obtains a user/device ID and a retail ID, an adding process to add a predetermined second parameter to a first parameter corresponding to the user/device ID, from among the plurality of first parameters recorded in the database, the second parameter indicating an amount of data to be added; a second obtaining unit that obtains an amount of data in a communication performed by the information-processing device via the predetermined network.

17 Claims, 9 Drawing Sheets

| MEDIUM ID | FLAG |
|---|---|
| AAA0000001 | DONE |
| AAA0000002 | DONE |
| AAA0100000 | NOT YET |
| AAA0100001 | NOT YET |
| ABB0000001 | DONE |
| ABB0000002 | DONE |

| MEDIUM ID | PACKET POINTS |
|---|---|
| AAA | 1,000 |
| ABB | 1,000 |
| ACD | 2,000 |

| DEVICE ID | RESIDUAL PACKET POINTS |
|---|---|
| 00000001 | 50,000 |
| 00000002 | 658,621 |
| 00000003 | 248 |

| DEVICE ID | RESIDUAL PACKET POINTS | HISTORY | | |
|---|---|---|---|---|
| | | MEDIUM ID | PACKET POINTS | TIME LIMIT |
| 00000001 | 50,000 | AAA0000001 | 1,000 | 2011/10/07 |
| 00000002 | 658,621 | ABB0012481 | 1,000 | 2011/12/24 |
| | | ACD0025471 | 2,000 | 2012/05/26 |
| 00000003 | 248 | | | |

US 10,009,186 B2

SERVER DEVICE, COMMUNICATION SYSTEM, INFORMATION-PROCESSING DEVICE, COMMUNICATION METHOD, AND STORAGE MEDIUM

This application claims priority to Japanese Application No. 2011-229716 filed Oct. 19, 2011, the entire contents of which is hereby incorporated by reference.

TECHNICAL FIELD

The present invention relates to a system for executing an application program, including a process for exchanging communication data via a communication network.

RELATED ART

A system for playing an online game via a communication network, under the terms of a contract, is known.

SUMMARY

When a system including a process for transferring data via a communication network is provided, a user should sign a contract with a communication carrier to the effect that the user is charged based on an amount of data transferred.

The present invention provides technology that enables an information-processing device executing an application program or a user of the information-processing device to provide a parameter indicating an amount of data to be transferred via the communication network.

According to one aspect of the invention, there is provided a server device, including: a storage unit configured to store a database in which are recorded a plurality of pairs of a user/device ID and a corresponding first parameter, the user/device ID being an identification of a user or an information-processing device, the first parameter indicating an amount of data that the user or the device has a right to communicate via a predetermined network; a first obtaining unit configured to obtain a user/device ID and a corresponding retail ID from the information-processing device having a function to execute an application program, the retail ID being an identification of each retailed application program; an adding unit configured to perform, in a case that the first obtaining unit obtains a user/device ID and the retail ID, an adding process to add a determined second parameter to a first parameter corresponding to the user/device ID obtained by the first obtaining unit, from among the plurality of first parameters recorded in the database; a second obtaining unit configured to obtain details of an amount of data transferred during communication performed by the information processing device via the predetermined network; and a subtracting unit configured to subtract the amount of data obtained by the second obtaining unit from the first parameter corresponding to the user/device ID of a user or an information processing device that performs the communication, from among the plurality of first parameters recorded in the database.

BRIEF DESCRIPTION OF THE DRAWINGS

Exemplary embodiments will be described with reference to the following drawings, wherein:

FIG. 7 shows an example of the table 413 (flag table);
FIG. 8 shows an example of the table 412 (point table);
FIG. 9 shows an example of the database 411.

DESCRIPTION

1. Configuration

Figure 1:
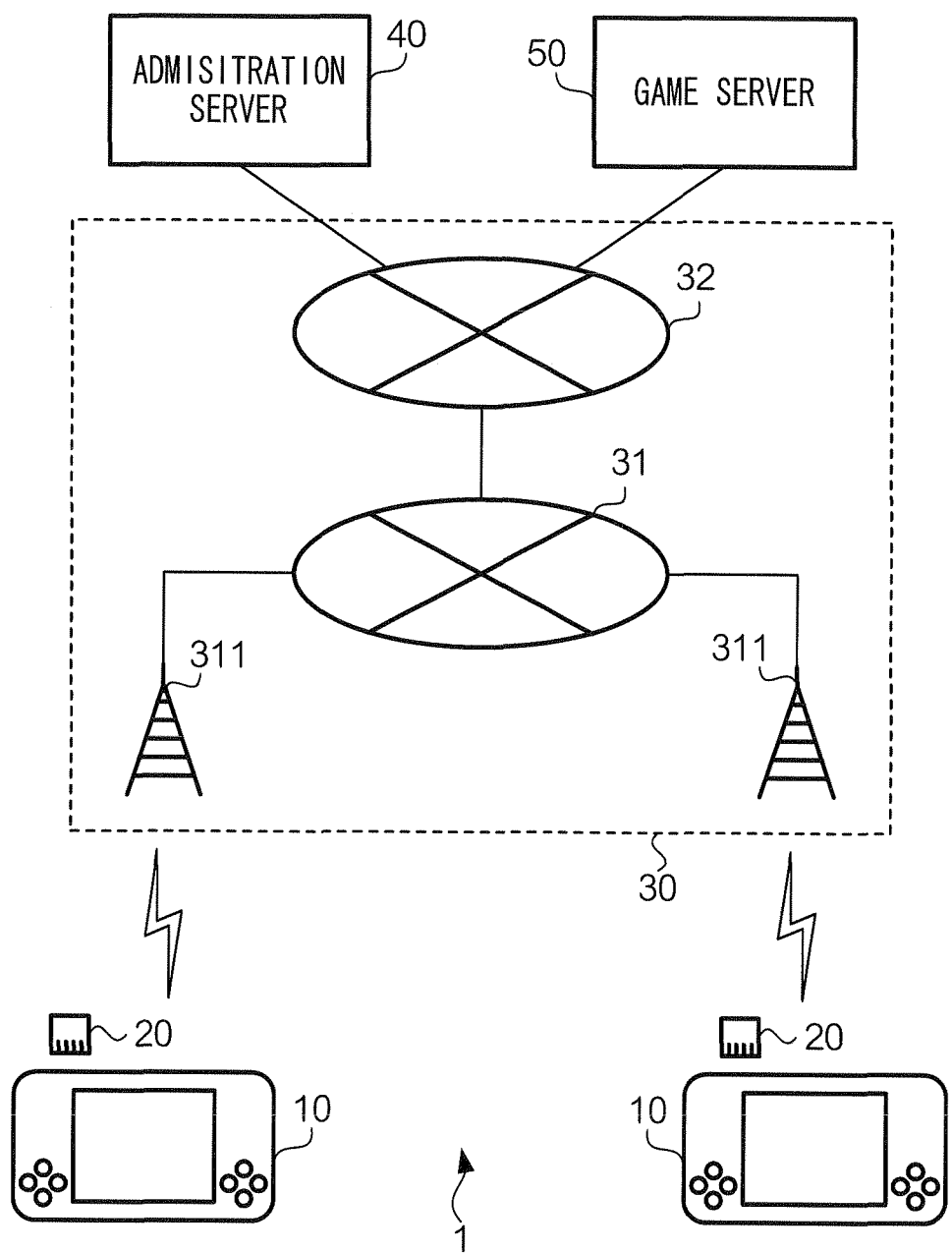
FIG. 1 shows an outline of the communication system 1.

FIG. 1 shows an outline of a communication system 1 according to one exemplary embodiment. The communication system 1 provides to a user who has purchased an application program (for example, a game program) a second parameter indicating an amount of data to be added to a first parameter. The first parameter indicates a right to communicate via a mobile communication network; more specifically, the first parameter indicates an amount of data transferred via the mobile communication network. The communication system 1 includes an information-processing device 10, a program medium 20, a network 30, the administration server 40, and the game server 50. The program medium 20 is a storage medium that stores an application program, for example, a game program. The information-processing device 10 is a device that executes the application program, for example, a portable game device. The network 30 is a network including a mobile communication network 31 and the Internet 32. The administration server 40 is a server that administrates the first parameter. The game server 50 is a server that provides services such as an online game.

The mobile communication network 31 is a mobile communication network that conforms to a predetermined standard, for example, GSM™ (Global System for Mobile Communications), so-called 3G, or LTE (Long Term Evolution), and is an example of a network for which an amount of transferred data is administrated by using the first parameter. The mobile communication network 31 includes a base station 311, a switch, a home memory, a gateway, and other devices (not shown in the drawings, except for the base station 311). In this example, mobile communication services for the information-processing device 10 are provided by a carrier of the information-processing device 10. The carrier of the information-processing device 10 is a MVNO (Mobile Virtual Network Operator). Furthermore, the carrier of the information-processing device 10 administrates the administration server 40 and the game server 50.

Figure 2:
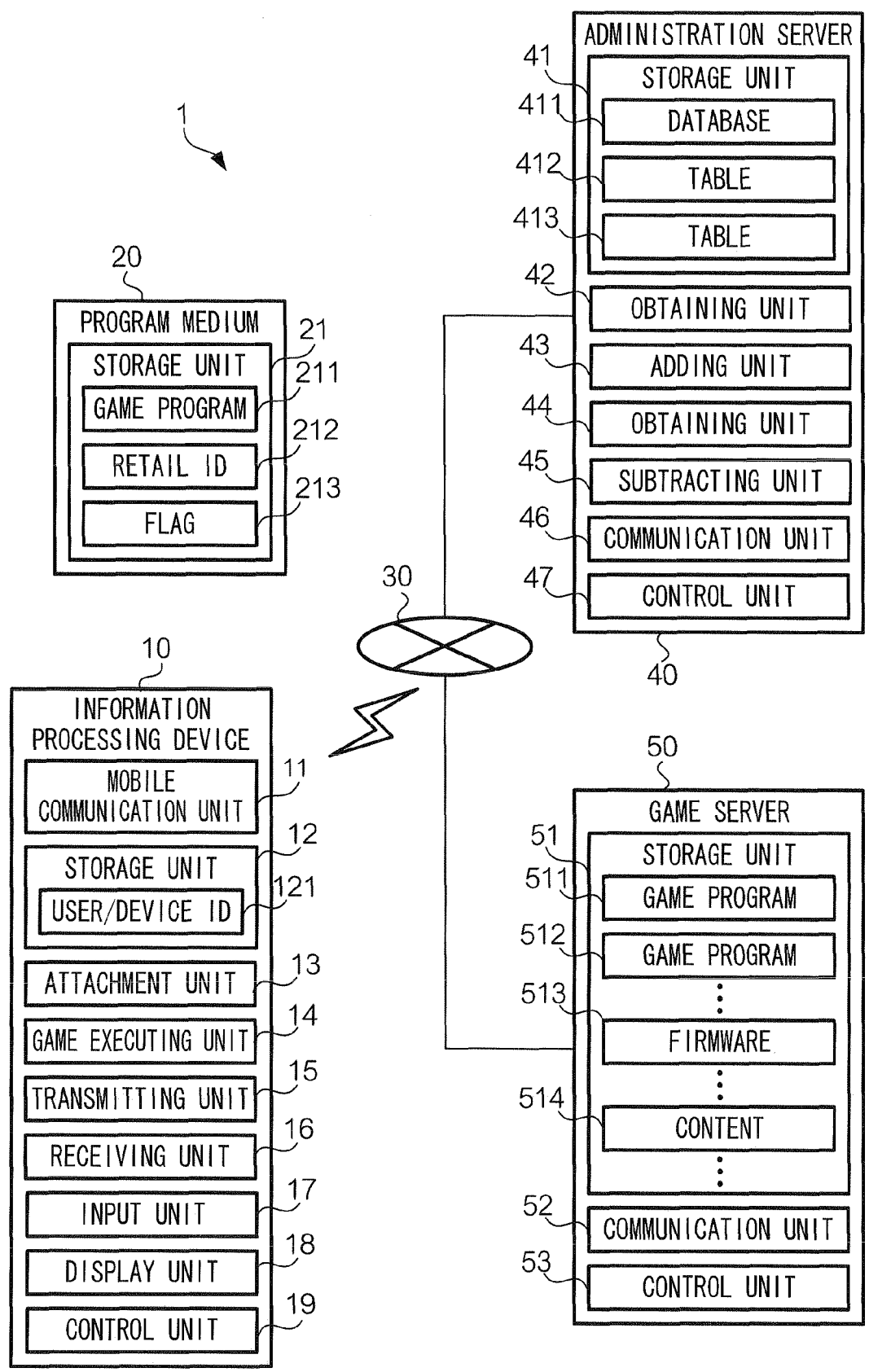
FIG. 2 shows a functional configuration of the communication system 1.

FIG. 2 shows a functional configuration of the communication system 1. The information-processing device 10 includes a mobile communication unit 11, a storage unit 12, an attachment unit 13, a game executing unit 14, a transmitting unit 15, a receiving unit 16, an input unit 17, a display unit 18, and a control unit 19. The mobile communication unit 11 communicates via the mobile communication network 31. The storage unit 12 stores a user/device ID 121, which identifies a user or an information-processing device 10. More specifically, the user/device ID 121 is an identification number to identify a user of the information-processing device 10 or the information-processing device 10. The attachment unit 13 is used to attach the program medium 20 (in other words, the program medium 20 is attached to the attachment unit 13).

The program medium 20 is an example of an application program medium having a storage unit 21. The storage unit 21 stores a game program 211, a retail ID 212, and a flag 213. The game program 211 is a program for causing the information-processing device 10 to execute a video game. The retail ID 212 is a unique identification number, which is allocated to every game program 211 sold. The flag 213 is a flag indicating whether the second parameter is already added to the first parameter corresponding to the program medium 20.

The game executing unit 14 executes a game program, for example, a game program stored in the program medium 20 attached to the attachment unit 13. The transmitting unit 15 transmits a pair of the retail ID 212 and the user/device ID 121 to the administration server 40. The retail ID 212 is read out from the program medium 20, which is attached to the attachment unit 13. The user/device ID 121 is read out from the storage unit 12. The receiving unit 16 receives the first parameter, which is increased in response to the pair of the retail ID 212 and the user/device ID 121. The input unit 17 inputs an instruction to an element of the information-processing device 10 such as the game executing unit 14. The display unit 18 displays an image in response to a program such as a game program. The control unit 19 controls other elements of the information-processing device 10.

The administration server 40 is an example of a server device including a storage unit 41, an obtaining unit 42, an adding unit 43, an obtaining unit 44, a subtracting unit 45, a communication unit 46, an updating unit 47, and a control unit 48. The storage unit 41 stores a database 411 that records plural pairs of a user ID and a first parameter indicating an amount of data available to be transferred via the mobile communication network 31, for each of plural users. The obtaining unit 42 obtains a user ID and a retail ID, these IDs corresponding with each other. "These IDs corresponding with each other" means the user ID and the retail ID are obtained separately with information showing a relationship between these IDs, as well the user ID and the retail ID being obtained simultaneously. The adding unit 43 adds a determined second parameter to the first parameter corresponding to the user ID obtained by the obtaining unit 42, from among the first parameters recorded in the database 411. In other words, the adding unit 43 performs an adding process for adding the second parameter to the first parameter recorded in the database 411. In this example, the second parameter is determined in response to the retail ID obtained by the obtaining unit 42. The obtaining unit 44 obtains details of an amount of data transferred by the information-processing device 10 via the mobile communication network 31. The subtracting unit 45 subtracts the amount of data obtained by the obtaining unit 44 from the first parameter corresponding to a user ID indicating a user who performs communication relating to the amount of data, from among the first parameters recorded in the database 411. The communication unit 46 communicates via the network 30.

The storage unit 41 further stores a table 412, which shows a relationship between a retail ID and a second parameter. The adding unit 43 uses the second parameter corresponding to the retail ID obtained by the obtaining unit 42, from among the second parameters recorded in the table 412.

The storage unit 41 further stores a table 413, which shows a relationship between a retail ID and a flag indicating whether the adding process is completed, for each of plural game programs. The adding unit 43 performs the adding process in a case that a flag corresponding to the retail ID obtained by the obtaining unit 42 indicates that the adding process is not completed.

The administration server 40 further includes the updating unit 47 and the control unit 48. When a retail ID is obtained for the first time, the updating unit 47 updates a flag recorded in the table 413 so that the flag indicates that the adding process is completed. The control unit 48 controls other elements of the administration server 40.

The game server 50 is an example of a server including a storage unit 51, a communication unit 52, and a control unit 53. The storage unit 51 stores various kinds of data relating to provided services, for example, a game program 511, a game program 512, firmware 513, and contents data 514. The game program 511 and the game program 512 are programs for causing the information-processing device 10 to execute a video game. The firmware 513 is a program for controlling the information-processing device 10. The contents data 514 is data indicating contents played or viewed in the information-processing device 10, for example, a movie, a still image, or music. The communication unit 52 communicates via the network 30. The control unit 53 controls other elements of the game server 50.

Figure 3:
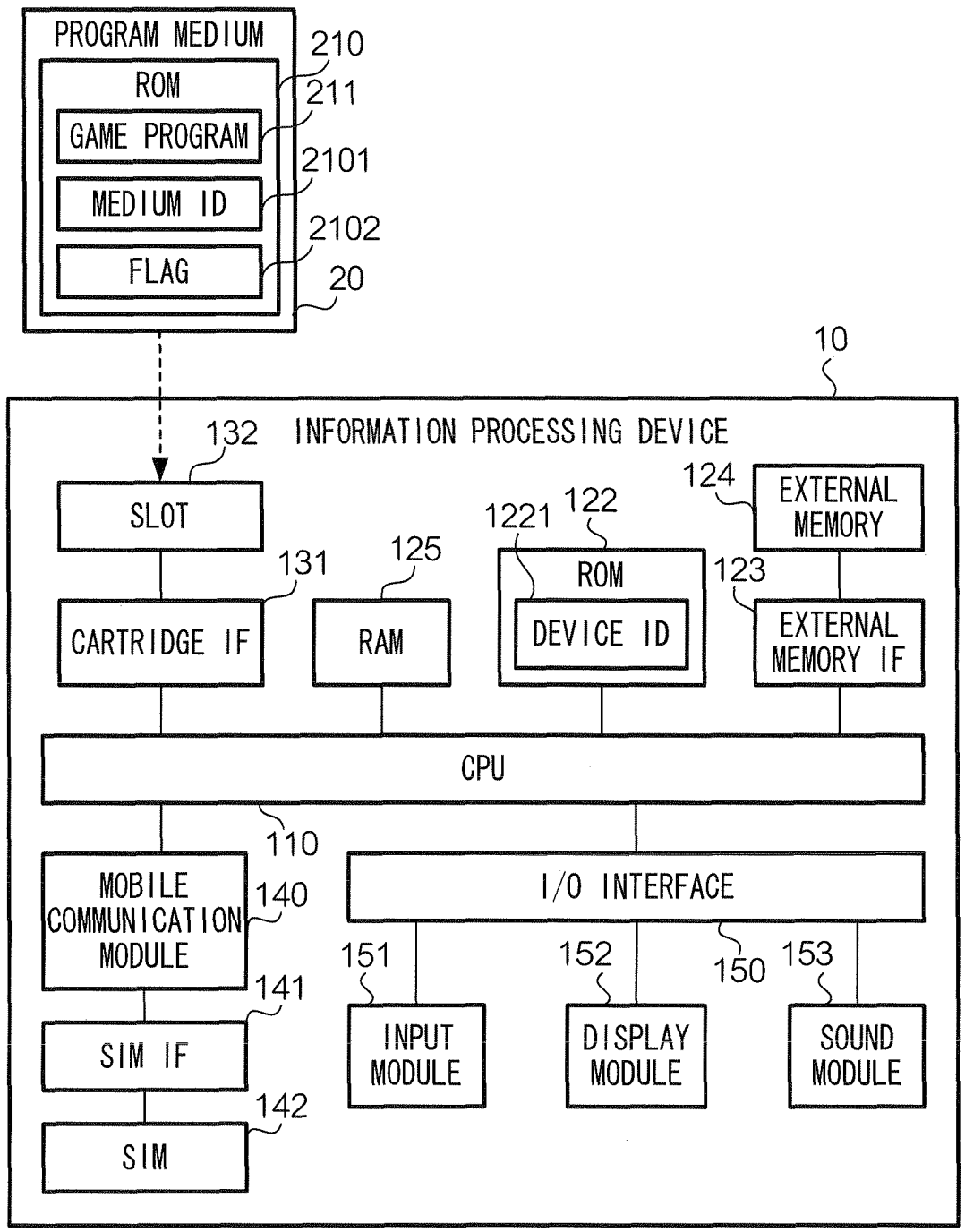
FIG. 3 shows a hardware configuration of the information processing device 10 and the program medium 20.

FIG. 3 shows a hardware configuration of the information-processing device 10 and the program medium 20. In this example, the information-processing device 10 is a portable game device. The information-processing device 10 is a computer device including CPU (Central Processing Unit) 110, RAM (Random Access Memory) 125, ROM (Read Only Memory) 122, an external memory interface 123, a cartridge interface 131, a slot 132, a mobile communication module 140, SIM (Subscriber Identity Module)-IF 141, a SIM 142, an I/O interface 150, an input module 151, a display module 152, and a sound module 153. The CPU 110 is a processor (or a control device) that controls other elements of the information-processing device 10. The RAM 121 is a volatile storage device that functions as a work area when the CPU 110 executes a program. The ROM 122 is a non-volatile storage device that stores a program and data. The ROM 122 stores, for example, an OS (Operating System) program, which is system software of the information-processing device 10, application programs such as a web browser or a music player (not shown in the figures), and the device ID 1221. The device ID 1221 is an identification number that identifies the information-processing device 10, and is an example of the user/device ID 121. In other words, in this example, the user/device ID 121 is given for every single information-processing device 10. Each single user/device ID 121 is unique, and corresponds to a single information-processing device 10. The external memory interface 123 is an interface that relays writing/reading data to/from an external memory 124. The external memory 124 is a storage device that stores a program or data. The external memory 124 may be mounted on a circuit board (not shown in the figures) or may be a detachable medium such as a memory card.

The cartridge interface 131 is an interface that relays writing/reading data to/from the program medium 20. The slot 132 has a predetermined form and size. The program medium 20 includes a housing (or case) (not shown in the figures) and the ROM 210 housed in the housing. The housing has a form and a size corresponding to the slot 132. The ROM 210 is a rewritable non-volatile memory, for example, a semiconductor memory. In other words, the program medium 20 is a ROM cartridge including a semiconductor memory. The ROM 210 stores the game program 211, a medium ID 2101, and a flag 2102. The medium ID 2101 is an identification number of the program medium 20 and an example of the retail ID 212.

The mobile communication module 140 is a module for communicating via the mobile communication network 31, and includes, for example, an antenna and an amplifier. The SIM interface 141 is an interface that relays writing/reading data to/from the SIM 142. The SIM 142 includes a storage device that stores an identification number to identify a subscriber in the mobile communication network 31. The SIM 142 may be detachable from the information-processing device 10 or may be mounted on a circuit board of the information-processing device 10.

The I/O interface 150 is an interface that relays inputting/outputting data to/from the CPU 110, and is connected to the input module 151, the display module 152, and the sound module 153. The input module 151 is a module that inputs data to the CPU 110, and includes, for example, a keypad, a touch screen, or a microphone. The display module 152 is a module that displays an image in accordance with instructions output from the CPU 110, and includes, for example, a liquid crystal display and a driver circuit. The sound module 153 is a module that outputs sound in accordance with instructions output from the CPU 110, and includes, for example, a speaker and an amplifier.

The mobile communication module 140 is an example of the mobile communication unit 11. The RAM 121, the ROM 122, and the external memory 124 are examples of the storage unit 12. The CPU 110 executing the OS program is an example of the game executing unit 14, the transmitting unit 15, the receiving unit 16, and the control unit 19. The input module 151 is an example of the input unit 17. The display module 152 is an example of the display unit 18. The slot 132 is an example of the attachment unit 13.

Figure 4:
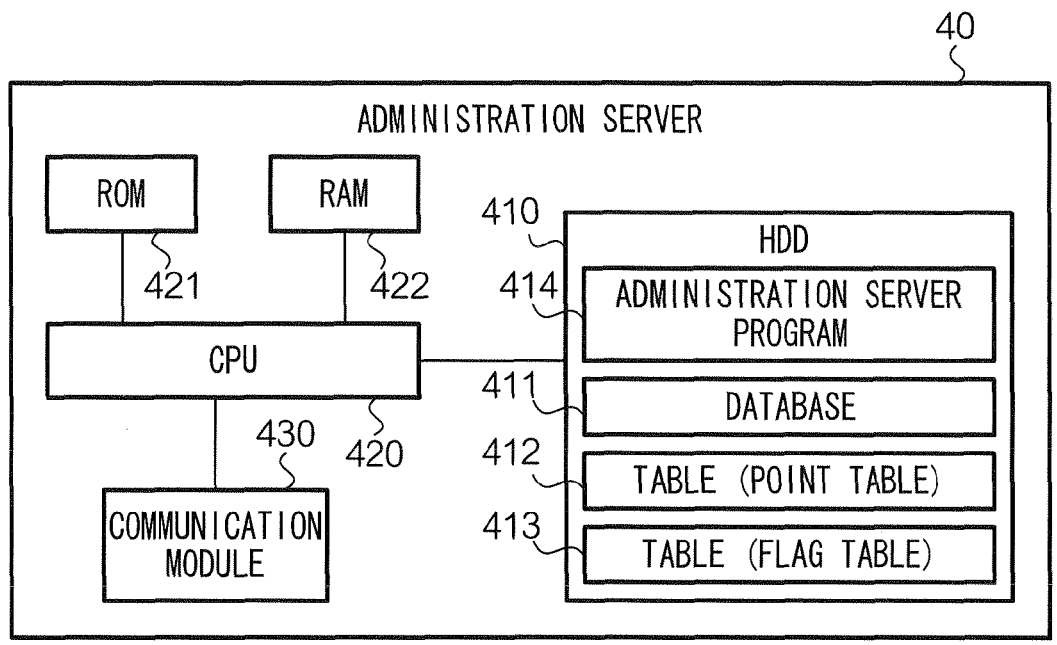
FIG. 4 shows a hardware configuration of the administration server 40.

FIG. 4 shows a hardware configuration of the administration server 40. The administration server 40 is a computer device including HDD (Hard Disk Drive) 410, a CPU 420, a ROM 421, a RAM 422, and a communication module 430. The HDD 410 is a non-volatile storage device. The HDD 410 stores an administration server program 414, the database 411, the table 412, and the table 413. The administration server program 414 is a program for causing a computer device to function as the administration server 40. The CPU 420 is a processor that controls other elements of the administration server 40. The ROM 421 is a non-volatile memory that stores a program and data. The RAM 422 is a volatile memory that functions as a work area for the CPU 420 executing a program. The communication module 430 is a module that communicates via the Internet 32, and includes, for example, a network interface. The HDD 410, the ROM 421, and the RAM 422 are an example of the storage unit 41. The CPU 420 executing the administration server program 414 is an example of the obtaining unit 42, the adding unit 43, the obtaining unit 44, the subtracting unit 45, the updating unit 47, and the control unit 48. The communication module 430 is an example of the communication unit 46.

In this example, the administration server 40 is connected to the Internet 32. In another example, the administration server 40 may be connected to the mobile communication network 31. The network configuration of the system, including functions and equipment of MVNO and MNO (Mobile Network Operator), is not restricted to an example of FIG. 1. In another example, a carrier of the information-processing device 10 may be a MNO.

Figure 5:
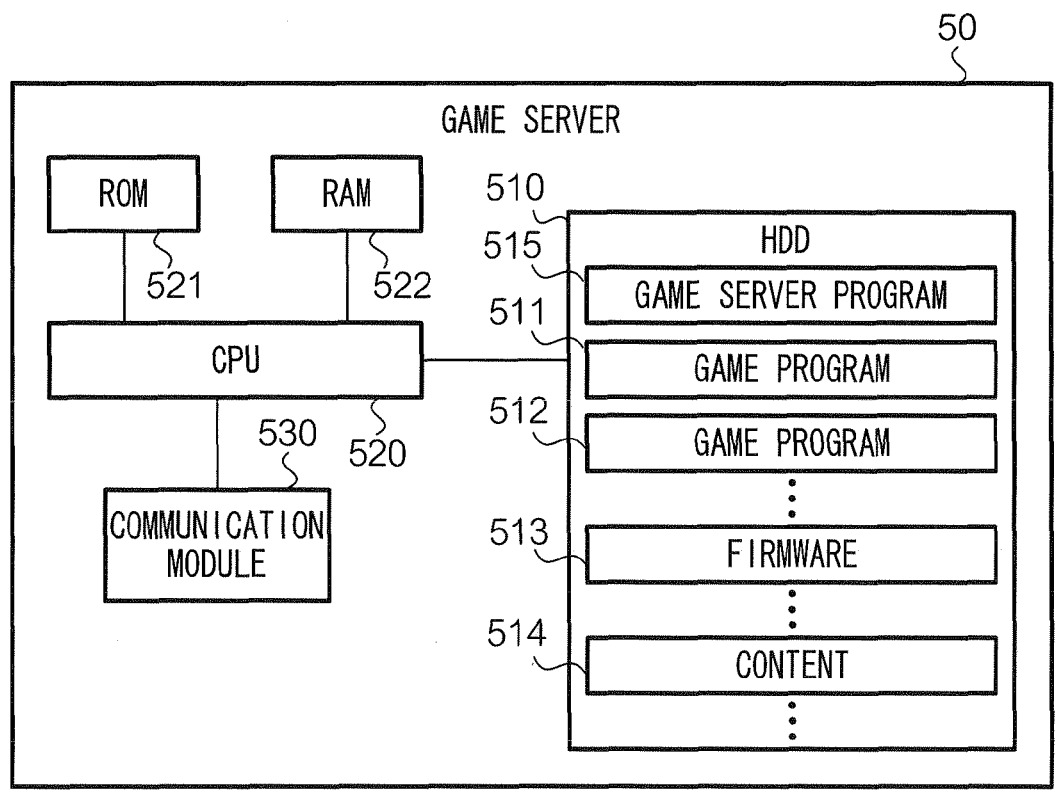
FIG. 5 shows a hardware configuration of the game server 50.

FIG. 5 shows a hardware configuration of the game server 50. The game server 50 is a computer device including a HDD 510, a CPU 520, a ROM 521, a RAM 522, and a communication module 530. The HDD 510 is a non-volatile storage device. The HDD 510 stores the game server program 515, the game program 511, the game program 512, the firmware 513, and the contents data 514. The game server program 515 is a program for causing a computer device to function as the game server 50. The CPU 520 is a processor that controls other elements of the game server 50. The ROM 521 is a non-volatile memory that stores a program and data. The RAM 522 is a volatile memory that functions as a work area for the CPU 520 executing a program. The communication module 530 is a module that communicates via the Internet 32, and includes, for example, a network interface. The HDD 510, the ROM 521, and the RAM 522 are an example of the storage unit 51. The CPU 520 executing the game server program 515 is an example of the control unit 53. Communication module 530 is an example of the communication unit 52.

2. Operation 2-1. Providing the First Parameter (by Retailing a Game Medium)

Figure 6:
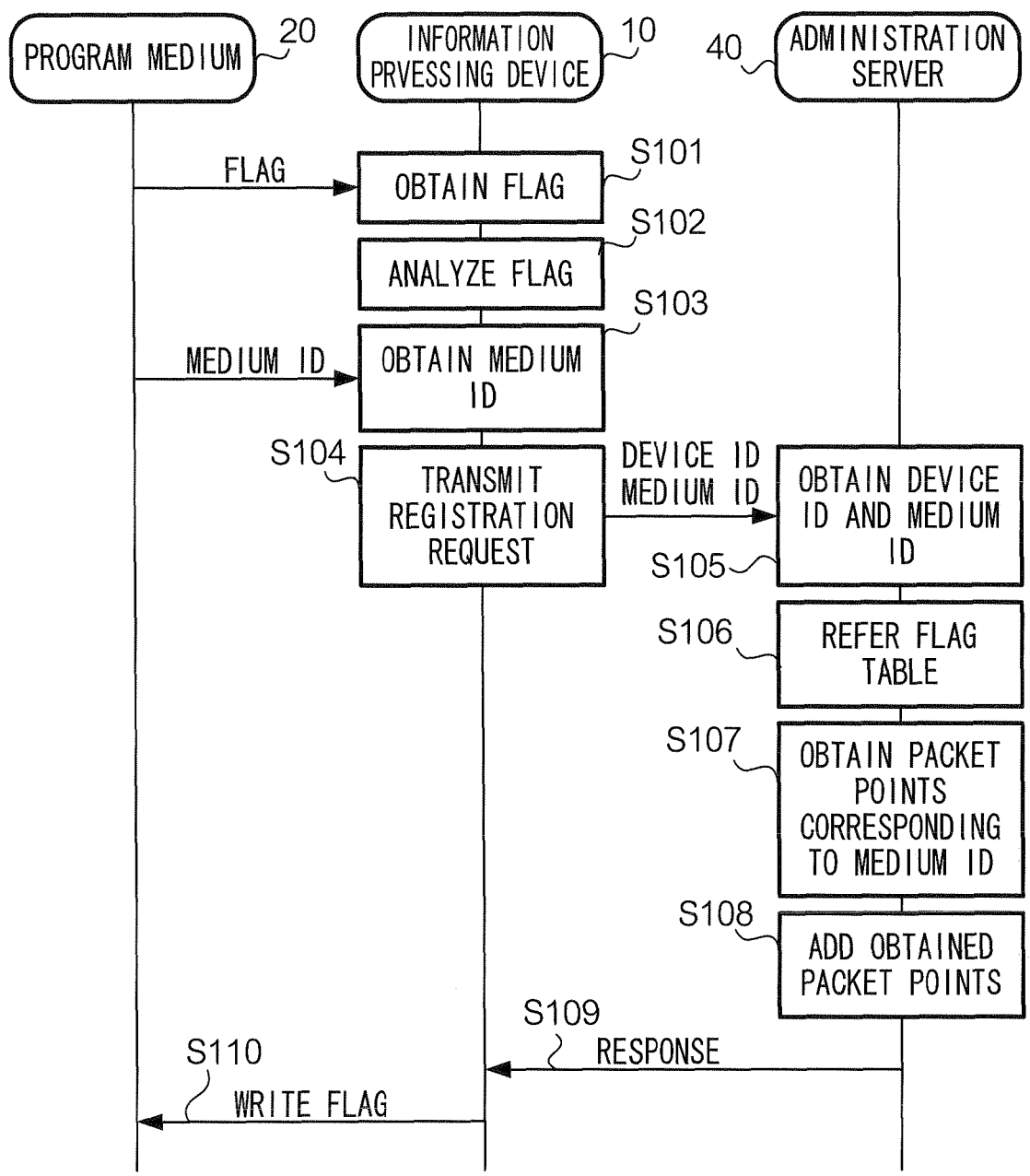
FIG. 6 shows a sequence chart illustrating a process for providing a first parameter.

FIG. 6 is a sequence chart illustrating a process for providing the first parameter in the communication system 1. The sequence chart provides an example of a case that a game program is retailed as the program medium 20. The sequence shown in FIG. 6 is initiated by a predetermined event; for example, a power of the information-processing device 10 is turned on as a result of the program medium 20 being inserted into the information-processing device 10. In the sequence, processes of the information-processing device 10 and the administration server 40 are achieved by the OS program and the administration server program 414, respectively. The other processes described are also achieved by these programs. In this example, the program medium 20 is inserted in the slot 132 of the information-processing device 10. Further, the information-processing device 10 is located at an area where the information processing device 10 can transmit/receive a radio wave to/from the base station 311. In the mobile communication network 31, a packet is used as a unit to count how much data is transferred. Further, a packet point is used as a unit to show the first parameter and the second parameter. The packet point indicates a number of packets that a user can transmit or receive. For example, if a user has 1,000 packet points, the user can communicate a maximum of 1,000 additional data packets.

In step S101, the information-processing device 10 obtains a flag from the program medium 20. More specifically, the CPU 110 reads out the flag from the ROM 210 via the cartridge interface 131. In step S102, the CPU 110 analyses the obtained flag. If the flag indicates "done," packet points given for the program medium 20 have already been registered at the administration server 40. In this case, the CPU 110 does not execute the following process. If the flag indicates "not yet," the packet points given for the program medium 20 have not been registered at the administration server 40. In this case, the CPU 110 executes the following process.

In step S103, the information-processing device 10 obtains the medium ID 2101 from the program medium 20.

More specifically, the CPU 110 reads out the medium ID 2101 from the ROM 210 via the cartridge interface 131. Further, the CPU 110 reads out the device ID 1221 from the ROM 122. The CPU 110 stores the medium ID 2101 and the device ID 1221 in the RAM 121.

In step S104, the information-processing device 10 transmits a registration request for registering (or adding) packet points to the administration server 40. The registration request includes a pair of a device ID and a medium ID, as well as an identification indicating that the registration request is for registering packet points. More specifically, the CPU 110 reads out the medium ID 2101 and the device ID 1221 from the RAM 121, and generates a registration request including these IDs. The CPU 110 transmits the generated registration request to the administration server 40 via the mobile communication module 140. An address of a destination of the request, the administration server 40, is predetermined and stored in the ROM 122.

In step S105, the administration server 40 receives the request. In other words, the administration server 40 obtains the medium ID 2101 and the device ID 1221. More specifically, the CPU 420 extracts the medium ID 2101 and the device ID 1221 from the request received via communication module 430. The CPU 420 stores the extracted the medium ID 2101 and the device ID 1221 in RAM 422.

In step S106, the administration server 40 refers a flag table. More specifically, the CPU 420 reads out a flag corresponding to the medium ID 2101 from the table 413 stored in HDD 410.

FIG. 7 shows an example of the table 413 (flag table). The table 413 includes plural pairs of medium ID and a corresponding flag. In this example, a medium ID consists of ten characters and numbers. More specifically, a medium ID consists of three characters and seven numeric digits. The three characters indicate an identification of a title of a game program. For example, an identification of "AAA" indicates a specific title of a game program. The seven numeric digits are an identification to uniquely identify a single program medium 20 storing a game program having the title. For example, if a million sales are made of program medium 20 storing a game program corresponding the ID "AAA," each program medium 20 has a unique ID number, for example, from "0000001" to "1000000." The flag indicates "done" or "not yet." "Done" and "not yet" indicate that the packet points corresponding to the medium ID have already been registered and have not been registered, respectively. For example, the first line data set in FIG. 7 indicates that the packet points corresponding to a single program medium 20 that is identified by the medium ID "AAA0000001" have been already registered.

Referring to FIG. 6 again. If a flag "done" is recorded in relation to the medium ID 2101 in the table 413, the CPU 420 does not execute the following processes. If a flag "not yet" is recorded in relation to the medium ID 2101 in the table 413, the CPU 420 executes the following processes.

In step S107, the administration server 40 obtains the packet points corresponding to the medium ID 2101. In this example, the packet points are obtained from the table 412. More specifically, the CPU 420 reads out the packet points corresponding to the medium ID 2101 from the table 412 stored in the HDD 410.

FIG. 8 shows an example of the table 412 (points table). The table 412 includes plural pairs of medium ID and corresponding packet points. In this example, the three characters identifying a game title described in FIG. 7 are used. For example, the first line data set indicates that 1,000 packet points are given for a single program medium 20 storing a game program corresponding to an identification "AAA."

Referring to FIG. 6 again, in step S108, the administration server 40 adds the obtained packet points as the second parameter to residual packet points of the user of the information-processing device 10. More specifically, the CPU 420 adds the packet points (an example of the second parameter) obtained in step S107 to the residual packet points (an example of the first parameter) corresponding to the device ID 1221 recorded in the database 411 stored in HDD 410.

FIG. 9 shows an example of the database 411. The database 411 includes plural pairs of a device ID and corresponding residual packet points. For example, the first line data set in FIG. 9 indicates that a user corresponding to a device ID "0000001" has 50,000 packet points as his/her own residual packet points.

Referring to FIG. 6 again, in step S109, the administration server 40 transmits a registration response to the registration request for registering the packet points to the information-processing device 10, which is a source of the registration request. More specifically, the CPU 420 generates a registration response including the residual packet points corresponding to the device ID 1221. The CPU 420 transmits the generated registration response to the information-processing device 10 via the communication module 430.

Receiving the registration response from the administration server 40, the information-processing device 10 executes processes in response to the registration response. In this example, the information-processing device 10 writes a flag in the program medium 20 (step S110). More specifically, the CPU 110 writes a flag "done" in the ROM 210 via the cartridge interface 131. Further, the CPU 110 controls the display module 152 to display an image showing the residual packet points.

2-2. Providing the First Parameter (by Download)

Figure 10:
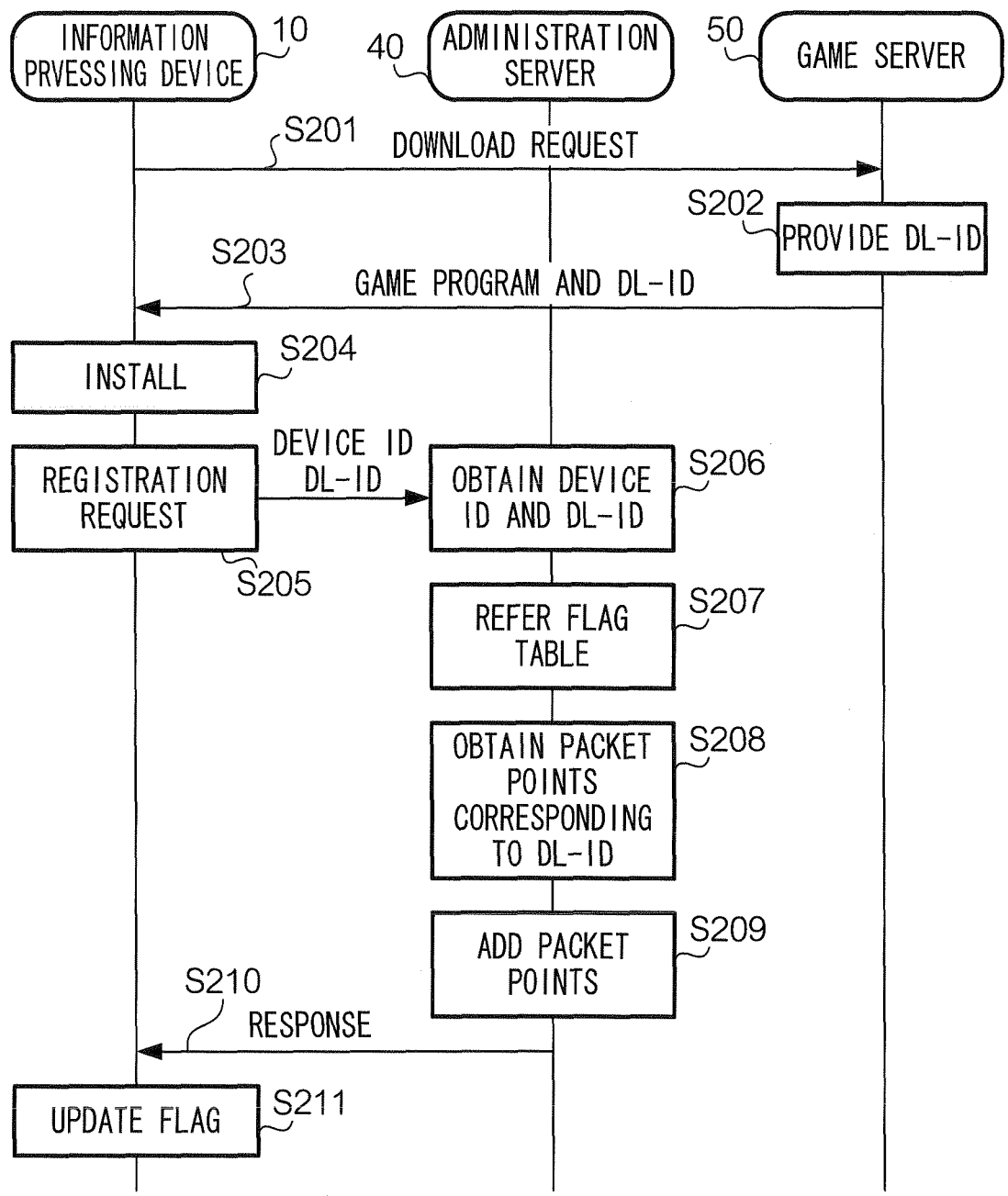
FIG. 10 shows a sequence chart illustrating a process for providing the first parameter.

FIG. 10 shows a sequence chart illustrating a process for providing the first parameter in the communication system 1. The sequence chart provides an example of a case where a game program is downloaded via a communication network. In this example, a download ID is used as the retail ID 212. The processes shown in FIG. 10 are initiated by a predetermined event, for example, an instruction to buy a program input in an online shop provided by the game server 50. For example, a user accesses a web site of the online shop via a web browser executed by the information processing-device 10, and provides an instruction to buy a game program via the input module 151.

In step S201, the information-processing device 10 transmits a download request for downloading a game program to the game server 50. The download request includes an ID number to identify a game program. More specifically, the CPU 110 generates the download request including a game program to be purchased. The CPU 110 transmits the download-generated request to the game server 50 via the mobile communication module 140.

When receiving the download request from the information-processing device 10, the game server 50 provides in step S202 a download ID (DL-ID) to the purchased game program. More specifically, the CPU 520 generates the download ID. The download ID is generated in accordance with a predetermined algorithm. In this example, the download ID consists of three characters and seven numeric digits, similarly to the medium ID described in FIG. 7. The three characters indicate an identification of a title of a game program. If a single title of a game program is retailed via two paths, by the program medium 20 and by download, the three characters differ in response to the path. The CPU 520 stores in the RAM 522 the generated download ID with the ID number of the purchased game program.

In step S203, the game server 50 transmits a download response to the information-processing device 10, which is a source of the download request. The download response includes the purchased game program and the download ID. More specifically, the CPU 520 generates the download response including the purchased game program and the download ID. The CPU 520 transmits the generated download response to the information-processing device 10 via the communication module 530.

When receiving the download response, the information-processing device 10 installs in step S204 the game program included in the download response. More specifically, the CPU 110 extracts the game program from the download response. The CPU 110 writes the extracted game program into the external memory 124 via the external memory interface 123. Further, the CPU 110 writes configuration information used when the game program is executed.

When the install is completed, the information-processing device 10 transmits in step S205 a registration request for packet points. The registration request includes the device 1D 1221 and the download ID. In step S206, the administration server 40 receives the registration request. In step S207, the administration server 40 refers to the table 413 (flag table). In step S208, the administration server 40 obtains packet points corresponding to the download ID from the table 413. In step S209, the administration server 40 adds the obtained packet points to the residual packet points of the user of the information-processing device 10. In step S210, the administration server 40 transmits a registration response to the information-processing device 10 in response to the registration request for packet points. The processes of steps S205-S210 are similar to steps S104-S109 in reading the medium ID 2101 with download ID.

When receiving the registration response from the administration server 40, the information-processing device 10 executes processes in response to the registration response. In this example, the information-processing device 10 writes, in steps S211, a flag into the program medium 20. More specifically, the CPU 110 writes a flag "done" into the external memory 124 via the external memory interface 123. The flag is stored in relation to the downloaded program. The flag is used to determine whether the registration request is to be resent at a predetermined timing (for example, on startup of the game program), in a case that, for example, the registration response cannot be transmitted because of wireless connection problems. Further, the CPU 110 controls the display module 152 to display an image showing the residual packet points.

2-3. Consuming (or Using) the First Parameter

Figure 11:
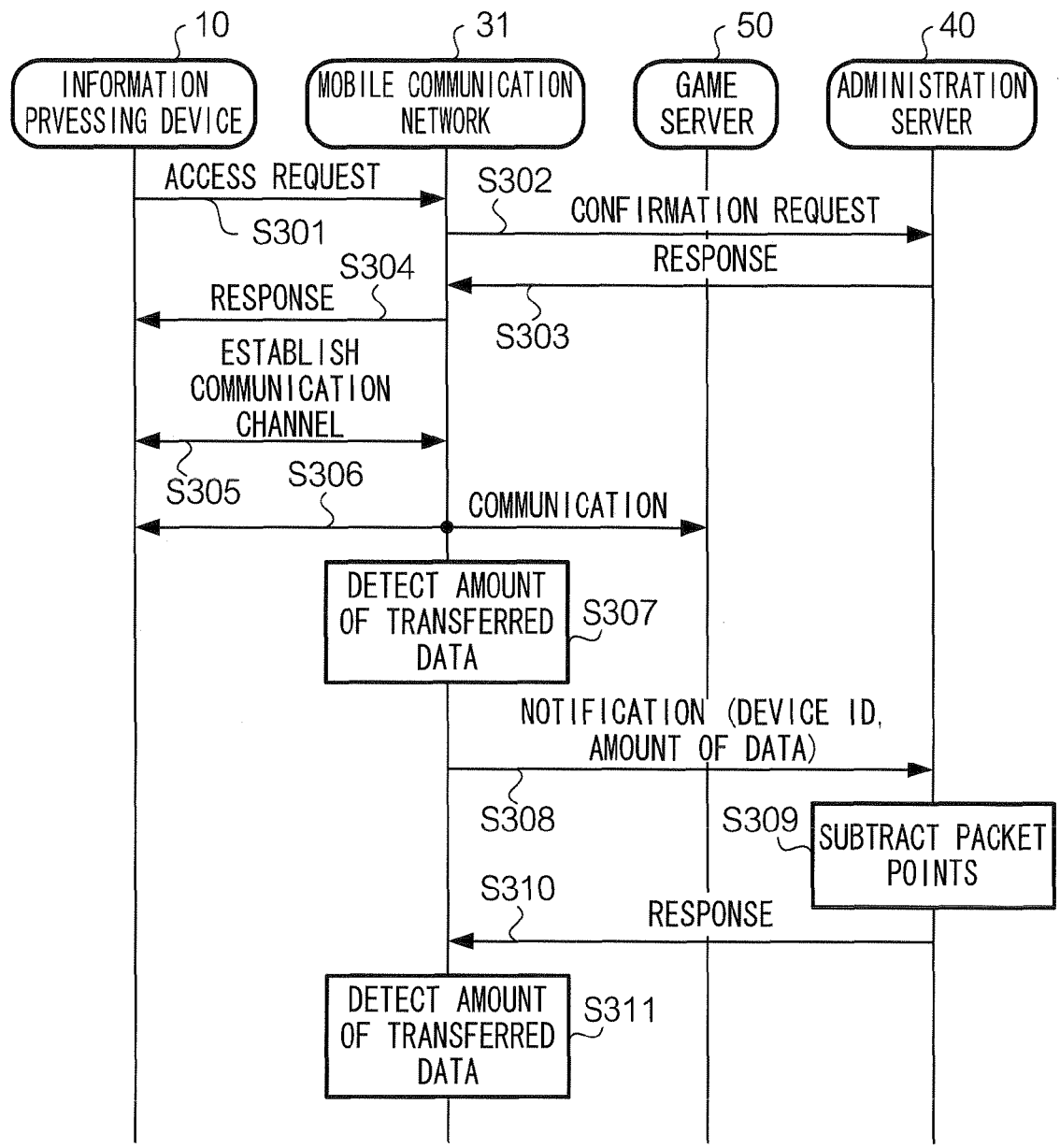
FIG. 11 shown a sequence chart illustrating a process for using the first parameter.

FIG. 11 shows a sequence chart illustrating a process for consuming (or using) the first parameter in the communication system 1. The sequence is initiated by a predetermined event, for example, an event where a game program executed in the information-processing device 10 generates an access request for the game server 50.

In step S301, the information-processing device 10 transmits an access request to the mobile communication network 31. The access request includes the device ID 1221. More specifically, the CPU 110 executing a game program generates an access request including the device ID 1221, and transmits the generated access request to the mobile communication network 31 via the mobile communication module 140.

When receiving an access request from the information-processing device 10, the mobile communication network 31 transmits, in step S302, a confirmation request for the residual packet points to the administration server 40. The confirmation request includes the device ID 1221 included in the access request. More specifically, the mobile communication network 31 generates the confirmation request, and transmits the generated confirmation request to the administration server 40.

When receiving a confirmation request from the mobile communication network 31, the administration server 40 transmits, in step S303, a confirmation response for the confirmation request. The confirmation response includes information indicating the residual packet points, for example, an amount of residual packet points. More specifically, CPU 420 reads out from the database 411 residual packet points corresponding to the device ID 1221 included in the confirmation request. CPU 420 generates a confirmation request including the read residual packet points. CPU 420 transmits the generated confirmation response to the mobile communication network 31 via communication module 430.

When receiving the confirmation response from the administration server 40, the mobile communication network 31 transmits in step S304 an access response for the access request, to the information-processing device 10 as a source of the access request. For example, if the residual packet points included in the confirmation response are greater than or equal to a predetermined threshold, the access response includes information indicating that the communication (access) is allowed. If the residual packet points included in the confirmation response are less than the predetermined threshold, the access response includes information indicating that the communication (access) is denied.

When receiving an access response, the information-processing device 10 establishes in step S305 a communication channel to the mobile communication network 31 in response to the access response. Further, in step S306, the information-processing device 10 initiates communication with the game server 50 via the mobile communication network 31. During the communication is performed, the mobile communication network 31 detects (or measures) in step S307 an amount of data transferred between the information-processing device 10 and the game server 50.

In step S308, the mobile communication network 31 transmits to the administration server at a predetermined timing a notification including an amount of data transferred between the information-processing device 10 and the game server 50. The predetermined timing is, for example, a timing specified by an executed game program, a timing when a game program is paused or terminated, or a periodical timing. The notification includes the device ID 1221 and an amount of transferred data. The amount indicates a number of packets for the transferred data.

When receiving a notification from the mobile communication network 31, the administration server 40 subtracts, in step S309, packet points in relation to the notification. More specifically, the CPU 420 extracts the device ID 1221 and the number of packets from the notification. The CPU 420 subtracts the extracted number of packets from the residual packet points corresponding to the device ID 1221 in the database 411. For example, in a case that the residual packet points at step S308 are as shown in FIG. 9, that the extracted number of packets is 1,000 packets, and that device ID is "00000001", residual packet points after the subtraction are 49,000 packet points. The CPU 40 writes the result of the subtraction as an updated packet points into the database 411.

In step S310, the administration server 40 transmits a response to the notification to the mobile communication network 31. The response includes, for example, the residual packet points. More specifically, the CPU 420 generates a response including the residual packet points. The CPU 420 transmits the generated response to the mobile communication network 31 via communication module 430.

When receiving a response from the administration server 40, the mobile communication network 31 executes, in step S311, a process in response to the received response. For example, if the residual packet points included in the response are less than a predetermined threshold, the mobile communication network 31 disconnects the communication from the information-processing device 10.

2-4. Conclusion of the Operation

As described above, according to the communication system 1, a user who purchased a new game program obtains right to communicate via the mobile communication network 31 up to a predetermined amount of data. Packet points are provided in response to the purchased game program according to a process illustrated in FIG. 6 in a case of purchasing a game program as the program medium 20, and according to a process illustrated in FIG. 10 in a case of purchasing a game program by download. For example, if a user (first user) inserts a newly purchased program medium 20 into his/her own the information-processing device 10, packet points are allocated to the user. In this case, an example is given for a case that the same the program medium 20 is transferred to another user (second user). If the second user inserts the transferred program medium 20 into his/her own the information processing device 10, packet points are not allocated to the second user because the table 413 shows that the packet points have been provided already. In other words, double registration of packet points is prevented. In another example, if a user inserts a newly purchased program medium 20 (first medium) into his/her own information-processing device 10, packet points are provided for the user. In this example, if the user purchases another new program medium 20 (second medium), which stores the same game program as the first medium, and inserts the second the program medium 20 (second medium) into his/her own the information-processing device 10, packet points are provided for the user because every program medium 20 is identified in the table 413. In other words, if a single user purchases two program media 20, which store the same game program (the same game title), the user obtains packet points twice.

The packet points are used in an online game, for example. In this embodiment, the communication system 1 does not restrict using packet points in a single game program by which the packet points are provided. Therefore, a user can use packet points, which were provided by a first game program, during communication in accordance with a second game program. In other words, the obtaining unit 44 obtains an amount of data transferred via the mobile communication network 31 by the information-processing device 10 executing an application program corresponding to a retail ID and other application programs.

As described above, the communication system 1 can provide the first parameter to a user in response to retailing (or purchasing) of a game program.

3. Modification

The present invention is not restricted to the embodiment described above. Various modifications can be applied to the exemplary embodiment. Some modifications will be described below. Two or more modifications from among the following modifications may be combined.

3-1. First Modification

In the exemplary embodiment, packet points can be registered at the first time the information-processing device 10 connects to the network 30 after the user purchases a new program medium 20 to exclude double registration of the packet points. In this modification, it is considered that a single user owns two information-processing devices 10, which will be identified as the information-processing device 10A and the information-processing device 10B. Further, device IDs of the information-processing device 10A and the information-processing device 10B are identified as the device ID 1221A and the device ID 1221B, respectively.

If the user registers packet points with the program medium 20 being inserted into the information-processing device 10A, no packet points are provided for the information-processing device 10B. If the user wishes to use the same program medium 20 with the information-processing device 10B, the packet points cannot be provided for the information-processing device 10B, in accordance with the above-described exemplary embodiment. In the first modification, a time period is provided to allow transfer of packet points from the information processing device 10A to the information processing device 10B.

In the first modification, the database 411 includes plural pairs of the user/device ID 121 and corresponding retail ID 212, as well as plural pairs of the retail ID 212 and the second parameter. If the obtaining unit 42 obtains a pair of the device ID 1221B and the retail ID 212 during a predetermined time period after receiving a specific medium ID 2101 (in relation to the device ID 1221A), the subtracting unit 45 subtracts the second parameter from the first parameter corresponding to the device ID 1221A in the database 411. Further, the adding unit 43 adds the subtracted second parameter to the first parameter corresponding to the device ID 1221B.

Figures 12, 13:
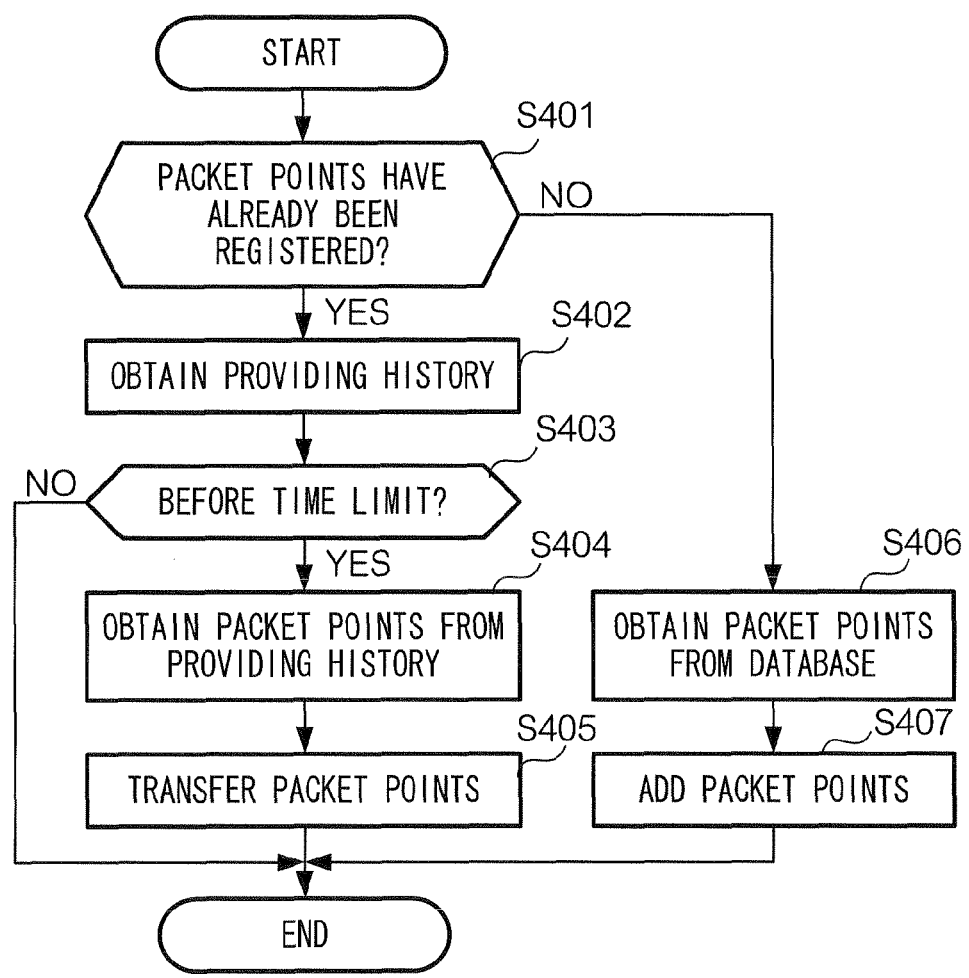
FIG. 12 shows an example of database 11 in accordance with first modification.
FIG. 13 shows a sequence chart illustrating a process for transferring the first parameter.

FIG. 12 shows an example of the database 411 in accordance with the first modification. In the first modification, the database 411 includes a history of providing packet points for each pair of device ID and residual packet points. The history includes a set of medium ID, packet points, and a time limit. For example, the first line data set in FIG. 12 shows the following.

A user having a device ID "00000001" has 50,000 packet points as residual packet points.
  (ii) The residual packet points includes 1,000 packet points that were provided when the user purchased the program medium 20 having medium ID "AAA0000001".
  (iii) The 1,000 packet points can be transferred until Oct. 7, 2011.

Further, in the example of FIG. 12, device ID "00000002" has two histories relating to medium ID "ABB001248" and medium ID "ACD0025471."

FIG. 13 shows a flowchart illustrating a process for transferring packet points. Before the flow illustrated in FIG. 13, processes of steps S103 and S104 are executed. In other words, the information-processing device 10 transmits to the administration server 40 a registration request for packet points. The registration request includes the device ID 1221B and the medium ID 2101. In this example, the device ID 1221A is "00000001" and the device ID 1221B is "00000002." Further, the medium ID 2101 is "AAA0000001". In the first modification processes of steps S101 and S102 are omitted.

In step S401, the administration server 40 determines whether packet points corresponding to the medium ID included in the registration request have been registered already. The determination is made by referring to the table 413. More specifically, the CPU 420 reads out a flag corresponding to the subject medium ID from the table 413 stored in HDD 410. If the flag indicates "done," the CPU 420 determines that the subject packet points have already been registered. If the flag indicates "not yet," the CPU 420 determines that the subject packet points have not already been registered. If it is determined that the subject packet points have been registered already (S401: YES), the CPU 420 transfers the operation to step S402. If it is determined that the subject packet points have not already been registered (S401: NO), the CPU 420 transfers the operation to step S406. In an example shown in FIG. 7, the flag corresponding to the medium ID "AAA0000001" indicates "done," it is determined that the subject packet points have been registered already.

In step S402, the CPU 420 obtains a providing history. More specifically, the CPU 420 reads out from the database 411 the providing history corresponding to the medium ID included in the registration request. In step S403, the CPU 420 determines whether a current time is before the time limit included in the read providing history. The current time is obtained from time keeping unit, for example, a timer. If it is determined that the current time is before the time limit (step S403: YES), the CPU 420 transfers the operation to step S404. If it is determined that the current time is after the time limit (step S403: NO), the CPU 420 deletes the providing history from the database 411, and terminates the operation shown in FIG. 13.

In step S404, the CPU 420 obtains packet points from the providing history. In an example shown in FIG. 12, 1,000 packet points are obtained as the packet points corresponding to the medium ID "AAA0000001."

In step S405, the CPU 420 transfers the packet points from the previous device ID to the new device ID included in the registration request. In this example, 1,000 packet points are transferred from the device ID 1221A (00000001) to the device ID 1221B (00000002). Details are as follows. The CPU 420 subtracts 1,000 packet points from the residual packet points corresponding to device ID1221A in the database 411. The residual packet points corresponding to the device ID 1221A become 49,000 packet points. Further, the CPU 420 writes into the RAM 422 the providing history corresponding to medium ID "AAA0000001", and then deletes from the database 411 the subject providing history. The CPU 420 adds 1,000 packet points to the residual packet points corresponding to the device ID 1221B in the database 411. The residual packet points corresponding to the device ID 1221B become 695,621. Further, the CPU 420 reads out the providing history corresponding to medium ID "AAA0000001" from the RAM 422, and writes the subject providing history into a storage area corresponding to the device ID 1221B.

In step S406, the CPU 420 obtains the packet points corresponding to the medium ID "AAA0000001" from the table 412. In step S407, the CPU 420 adds the obtained packet points to the packet points corresponding to the device ID 1221B in the database 411. These processes are performed similarly to steps S107 and S108.

The first modification provides transferring packet points from one user to another user, until a predetermined time limit. Password authentication may be performed before transfer of the packet points.

In another example, the condition for transferring packet points is not restricted to the time limit. Another condition, for example, a number of times that a game program is started up, may be used.

3-2. Second Modification

A method for determining packet points to be added is not restricted to an example described in the exemplary embodiment. The adding unit 43 may add packet points that are increased or decreased in response to an attribute of the information-processing device 10, a user, or a game program. Examples of the attribute are described as follows.

(1) Examples of the attribute of the information-processing device 10.
   (a) Location information of the information-processing device 10 (in this case, the information-processing device 10 includes a location information obtaining unit, for example, a GPS (Global Positioning System) receiver.
   (b) Model of the information-processing device 10.

(2) Examples of the attribute of a user
   (a) Purchase history of game programs.
   (b) Age, sex, residence (3) Examples of the attribute of a game program
   (a) elapsed time form the sale date
   (b) maker (or vendor)

Examples of increasing or decreasing packet points are as follows.

(1) Example of increasing packet points

In this example, a purchase history of a game program is used as an attribute. The purchase history includes a rank determined based on a cumulative amount of money of game programs. A coefficient, which is to be multiplied to the packet points, increases as the rank increases. For example, the initial value of the coefficient is 1.0, and the coefficient increases to 1.1, 1.2, 1.3, or 2.0 as the rank increases.

(2) Example of decreasing

In this example, a time elapsed since the sales date is used. The coefficient decreases as the elapsed time increases.

The information-processing device 10 transmits information indicating the attribute to the administration server 40. The administration server 40 stores the information indicating the attribute into the database 411. When the packet points to be added are determined, the information indicating the attribute is referred to. In the second modification, packet points are varied in response to the attribute.

3-3. Third Modification

The user/device ID 121 is not restricted to the device ID 1221, an ID number of the information-processing device 10. A user ID may be used as the user/device ID 121. In a case that plural users share a single information-processing device 10, the ROM 122 stores plural user/device IDs 121 corresponding to the plural users. At a predetermined timing, for example, when the information-processing device 10 is booted, an active user is selected by a log-in process, for example. In this case, a user ID of the active user is transmitted as the user/device ID 121 instead of the device ID 1221 in processes shown in FIG. 6, for example. In another example, if a single user owns two information-processing devices 10, ROMs 122 of two information-processing devices 10 store the same user ID.

In the third modification, the communication system 1 provides packet points for each user even if users and information-processing devices 10 do not correspond one for one.

3-4. Fourth Modification

In the exemplary embodiment, there is no restriction to use of packet points only when the communication is related to a game program for which the subject packet points were provided when the game program was purchased. However, a game program that can consume packet points may be restricted to a specific game program for which the subject packet points were provided when the game program was purchased. In this example, the obtaining unit 44 obtains an amount of data transferred via mobile communication network when an application program corresponding to a retail ID is being executed. In this case, the database 411 stores residual packet points for each retail ID. The subtracting unit 45 subtracts an amount of transferred data obtained by the obtaining unit 44 from the residual packet points corresponding to the retail ID of the subject application program from among the residual packet points recorded in the database 411.

3-5. Further Modification

The table 412 may be omitted. In this case, packet points to be provided are determined as a common value for all the game titles, and are not dependent on a specific game title. The adding unit 43 adds a predetermined number of packet points. In another example, packet points to be provided may be stored in the program medium 20. In this case, a registration request for packet points includes the packet points read out from the program medium 20. The administration sever 40 adds the packet points included in the registration request.

A method for excluding double registration is not limited to that described in the exemplary embodiment. For example, the table 413 need not be used. In this example, the double registration is excluded by using a flag stored in the program medium 20 or the information-processing device 10.

In another example, the program medium 20 (or the external memory 124 for an example of download) may not store the flag 213. In this case, the ROM 210 of the program medium 20 may not be rewritable. For example, the program medium 20 may be an optical disk. In this case, the information-processing device 10 transmits a registration request at a predetermined timing, for example, when a game program is started-up, because the information-processing device 10 cannot determine whether the packet points have been registered already. In another example, even if the program medium 20 stores the flag 213, the information-processing device 10 may transmit the registration request at a periodic predetermined timing, independently of the flag. In other words, the transmitting unit 15 may transmit a pair of a medium ID and user/device ID to the administration server 40 when the game executing unit 14 starts up the game program. The medium ID is read out from the program medium 20 being attached to the attachment unit 13. The user/device ID is read out from the storage unit 12.

An amount of packets consumed may be varied in response to a condition. For example, an amount of packets used for downloading a purchased game program may not be subtracted from the residual packet points in the database 411. Alternatively, an amount of packets transferred via a specific program, for example, a web browser, may not be subtracted from the residual packet points in the database 411.

An event to trigger increasing the packet points is not restricted to purchase of a game program. For example, new packet points may be provided via an online shop provided by the game server 50.

The network via which the information-processing device 10 communicates is not restricted to the mobile communication network 31. The information-processing device 10 may include a wireless LAN communication unit that communicates in conformity with so-called WiFi. In such a case, the information-processing device 10 may transmit a registration request via the wireless LAN in a case that the information-processing device 10 cannot communicate via the mobile communication network 31, for example, in a case that the information processing device 10 is located outside a service area of the mobile communication service.

A unit to measure an amount of transferred data is not restricted to a packet. Another unit, for example, a length of time during which data is transferred, may be used to measure the amount of transferred data.

A hardware configuration to achieve the functions shown in FIG. 2 is not restricted to the configuration described in FIGS. 3, 4, and 5. The communication system 1 may have another hardware configuration as long as the functions shown in FIG. 2 are achieved. For example, the administration server 40 may be replaced with plural devices. In another example, a single device may replace both the administration server 40 and the game server 50. Further, at least some of the functions shown in FIG. 2 may be omitted.

A network in which an amount of transferred data is measured is not restricted to the mobile communication network 31. The amount of data may be measured in another network.

The information-processing device 10 and the program medium 20 are not restricted to a game device and a game medium. The storage unit 21 may store an application program other than a game program, for example, an application program for editing a document, an educational application program, or a business application program. In another example, the information-processing device 10 may be an information-processing device other than a game device, for example, a personal computer, a mobile phone, a PDA (Personal Digital Assistant), or a tablet device.

A program executed by a processor such as the CPU 101 may be provided in a non-statutory computer readable storage medium, for example, a magnetic medium (for example, magnetic tape, magnetic disk (for example, a hard disk, a flexible disk, etc)), an optical medium (for example, an optical disk such as CD (Compact Disk) or DVD (Digital Versatile Disk)), a magnetic optical medium, a semiconductor memory (for example, a flash memory). Further, the program may be downloaded via a network, for example, the Internet.

What is claimed is:

1. A server device, comprising:
    a storage unit configured to:
        store a user/device ID and a corresponding first parameter, the user/device ID indicating a user and/or an information-processing device, the first parameter indicating an amount of data that the user or the information-processing device has a right to communicate via an electronic communications network,
        a second table including a plurality of flags, each flag indicating that an adding process for the corresponding retail ID is completed for each of the plurality of application programs
    a processing system including at least one processor, the processing system configured to:

obtain the user/device ID and a corresponding retail ID from the information-processing device having a function to execute an application program, the retail ID being an identification of at least one application program;

perform, as a result of obtaining the user/device ID and the corresponding retail ID, the adding process to add to the first parameter an amount of data that corresponds to the retail ID of the at least one application program;

update the flag corresponding to the retail ID in the second table so that the flag indicates that the adding process has been completed in response to obtaining the retail ID for the first time;

obtain an amount of data that has been communicated by the information-processing device via the electronic communications network; and subtract the obtained amount of data from the first parameter corresponding to the user/device ID, wherein the adding process is performed in a case that a flag corresponding to the retail ID is obtained.

2. The server device according to claim 1, wherein the storage unit is further configured to store a first table including a plurality of pairs of a retail ID and a second parameter, where the plurality of pairs of a retail ID and a second parameter includes the corresponding retail ID and a paired second parameter that indicates the amount of data.

3. The server device according to claim 1, wherein the storage unit is further configured to store a retail ID corresponding to the user/device ID and a second parameter corresponding to the retail ID, the processing system is further configured to
obtain a second user/device ID and another instance of the first retail ID after the corresponding retail ID is received, the a second user/device ID being different from a first user/device ID;
subtract the amount of data from the first parameter corresponding to the first user/device ID; and
add the amount of data to the first parameter corresponding to the second user/device ID.

4. The server device according to claim 1, wherein the amount of data is increased or decreased in response to an attribute of the information-processing device.

5. The server device according to claim 4, wherein the attribute includes a purchase history of application programs by a user of the information-processing device.

6. The server device according to claim 4, wherein the attribute includes a location of the information-processing device.

7. The server device according to claim 1, wherein the amount of data is the adding unit is configured to increased or decreased in response to an elapsed time from sales data of the application program.

8. The server device according to claim 7, wherein the obtained amount of data includes data communicated by an application program corresponding to the retail ID.

9. The server device according to claim 8, wherein the obtained amount of data includes data communicated by an application program other than the application program corresponding to the retail ID.

10. The server device of claim 1, wherein the processing system is further configured to:
obtain the user/device ID and another retail ID from the information-processing device, the another retail ID being an identification of another instance of the at least one application program; and
adjust the first parameter in accordance with an amount of data associated with the another retail ID.

11. A communication system comprising:
a program medium that includes a first storage device configured to store an application program and a medium ID, the application program including a process for communicating data via a predetermined network, the medium ID uniquely identifying the program medium;
an information-processing device comprising:
a transceiver configured to communicate data via the predetermined network;
a second storage device configured to store a user and/or device ID that is an identification of a user or the information-processing device;
a connector that is configured to connect to the program medium;
a processing system that includes at least one processor, the processing system configured to:
execute the application program stored in the program medium;
transmit, using the transceiver, to a server device the medium ID of the program medium and the user and/or device ID; and
the server device comprising:
a storage medium system configured to:
store a database that includes a plurality of pairs of a user and/or device ID and a corresponding first parameter, the user and/or device ID being an identification of a user and/or an information-processing device, the first parameter indicating an amount of data that the user or the device has a right to communicate via a predetermined network, and
store a plurality of flags that each indicate a status for an adding process for a corresponding retail ID for each of a plurality of application programs; and
a processing system that includes at least one processor, the processing system configured to:
obtain a user/device ID and a corresponding retail ID from the information-processing device;
perform an adding process to add a second parameter to a first parameter corresponding to the obtained user/device ID, the determined second parameter indicating an amount of data to be added and corresponding to the obtained retail ID;
in response to obtaining the retail ID for the first time, update the flag corresponding to the retail ID so that the flag indicates that the adding process has been completed;
obtain an amount of data that has been communicated by the information-processing device via the predetermined network; and
subtract the obtained amount of data from the first parameter corresponding to the user and/or device ID,
wherein the adding process is performed in a case that a flag corresponding to the retail ID is obtained.

12. An information-processing device comprising:
a transceiver configured to communicate data using an electronic communications network with a remote server device, the remote server device storing a user/device ID and a corresponding first parameter, the user/device ID indicating a user and/or an information-processing device, the first parameter indicating an amount of data that the user or the information-processing device has a right to communicate via the electronic communications network, the remote server device storing a plurality of flags, each flag indicating that an adding process for the corresponding retail ID is completed for each of the plurality of application programs;

an attachment connector configured to allow a storage medium device to be attached, the storage medium device including a memory device configured to store an application program and a medium ID, the application program including a process for communicating data via the electronic communications network, the medium ID uniquely identifying the storage medium device;

a second memory storage device configured to store a user/device ID that is an identification of a user or the information-processing device;

a processing system that includes at least one processor, the processing system configured to:
 execute the application program stored in the storage medium device when attached to the attachment connector;
 transmit the medium ID and the user/device ID to a remote server device, wherein the transmitted medium ID and the user/device ID causes the service device to update the flag corresponding to the retail ID in the second table so that the flag indicates that the adding process has been completed in response to obtaining the retail ID for the first time; and
 accept a first parameter to which a second parameter is added, the second parameter indicating an amount of data that is based on the medium ID and the user/device ID, the first parameter indicating a second amount of data that the user or the device has a right to communicate via the electronic communications network, wherein the adding process is performed in a case that a flag corresponding to the retail ID is obtained by the server.

13. A communication method for use with a computing device that includes at least one processor, the computing device coupled to a communication system, the method comprising:
 storing plural first parameters with the computing device, the plural first parameters corresponding to plural account identifiers, the plural first parameters respectively indicating an amount of data;
 obtaining an account identifier and a retail ID from an information-processing device, the obtained account identifier being one of the stored plural account identifiers and the retail ID being associated with at least one application program used and/or installed with the information-processing device;
 storing a plurality of flags that each indicate a status of whether or not an adding process has been performed for a corresponding retail ID for each of the application programs;
 in response to obtaining the account identifier and the retail ID from the information-processing device, performing, using the at least one processor, an adding process to add a second parameter to the first parameter that corresponds to the obtained account identifier, wherein the second parameter corresponds to obtained retail ID transmitted from the information-processing device;
 based on obtaining the account identifier and the retail ID from the information-processing device, updating the flag corresponding to the retail ID so that the flag indicates that the adding process has been completed;
 obtaining an amount of data that the information-processing device has communicated via an electronic communications network; and
 subtracting the obtained amount of data from the stored first parameter that corresponds to the obtained account identifier, wherein the adding process is performed in a case that a flag corresponding to the retail ID is obtained.

14. A non-transitory computer-readable storage medium storing an information processing program for use with a computing system that includes at least one processor coupled to a memory device, the information processing program comprising instructions that, when executed by the at least one processor, cause the computing system to:
 accept a client ID and a corresponding application ID from a remotely located information processing device, the client ID indicating a user ID and/or device ID, the corresponding application ID identifying an application program;
 store a plurality of flags that each indicate a status for an adding process for each of the corresponding application IDs for each of the application programs;
 obtain an amount of data that has been communicated by the information-processing device using an electronic communications network;
 in response to accepting the client ID and the corresponding application ID, perform an adding process that includes adding a second parameter to a first parameter, the second parameter being linked to the accepted corresponding application ID, the first parameter being stored with the computing system, associated with the client ID, and indicating how much data that the user or device associated with the client ID has a right to communicate through the electronic communications network;
 in response to obtaining the retail ID for the first time, update the flag corresponding to the retail ID so that the flag indicates that the adding process has been completed;
 subtract the obtained amount of data from the first parameter, wherein the adding process is performed in a case that a flag corresponding to the retail ID is obtained.

15. The non-transitory computer-readable storage medium of claim 14, wherein the application ID is a retail application ID.

16. The non-transitory computer-readable storage medium of claim 15, wherein first and second instances of the application program are associated with different retail application IDs.

17. A method of metering an amount of data communicated over an electronic communications network, the method comprising:
 determining an application identifier of an application execution capability added to an information processing device;
 storing a plurality of flags that each indicate a status for an adding process for each one of a plurality of corresponding application identifiers for each application execution capability;
 in response to determination of the application identifier, using at least one processor, performing the adding process that includes increasing a data communication limit that is associated with an account identifier, which is linked to the information processing device, in response to the added application execution capability, the data communication limit being increased by a variable amount that depends on the determined application identity of the added application execution capability;

in response to obtaining the application identifier for the first time, update the flag corresponding to the application identifier so that the flag indicates that the adding process has been completed;

metering an amount of data that the information processing device communicates; and automatically preventing the amount of communicated data from exceeding the data communication limit, wherein the adding process is performed in a case that a flag corresponding to the application identifier is obtained.

* * * * *